United States Patent [19]

Gower-Rees

[11] 3,779,562

[45] Dec. 18, 1973

[54] PHONOGRAPH STYLUS USE COUNTER

[75] Inventor: Christopher David Gower-Rees, Toronto, Ontario, Canada

[73] Assignee: Beverly Walton, Ontario, Canada

[22] Filed: Sept. 20, 1971

[21] Appl. No.: 181,726

[52] U.S. Cl. .............................................. 274/10 R
[51] Int. Cl. ...................... G11b 27/36, G11b 17/08
[58] Field of Search ................. 274/1 R, 10 R, 10 D

[56] References Cited

UNITED STATES PATENTS 2,270,415 1/1942 Catucci ........................... 274/10 R

*Primary Examiner*—Harry N. Haroian

*Assistant Examiner*—D. Moore

*Attorney*—J. Noel Walton

[57] ABSTRACT

A device for counting the number of record disc sides played on a phonograph includes a support member or pedestal which is mounted on the motor board of the phonograph outwardly of the turntable. An actuating member is pivotally mounted on the pedestal so as to project into the path of a record disc moving along the upstanding axial spindle of the turntable and a digital counter is electrically or mechanically coupled to the actuating member so that, as a record disc moves downwardly along the axial spindle, the digital counter is caused to undergo unit advance actuation whereas no such actuation occurs on removal of a record disc upwardly along the turntable spindle.

32 Claims, 14 Drawing Figures

PHONOGRAPH STYLUS USE COUNTER

BACKGROUND OF THE INVENTION

The present invention relates to a device for counting the number of record disc sides played on a phonograph as well as to phonographs with such devices mounted thereon.

It is well known that the needles of styli presently used on phonographs gradually become worn and blunted during use and should, therefore, periodically be replaced so as to ensure satisfactory sound reproduction and to avoid damage to the record discs on which they are used.

Although mechanisms and devices have heretofore been proposed for measuring the extent of use of a phonograph needle or stylus, many of such previously proposed devices have been relatively complex and expensive and their installation on a phonograph has involved either electrical connection to the electrical system of the phonograph or mechanical coupling of the device to the record-changing mechanism provided beneath the turntable of the phonograph. Consequently, such previously proposed devices have not been particularly suited to simple and inexpensive installation on existing phonographs by the owners of such phonographs.

Furthermore, many of the previously proposed devices for measuring the extent of use of a phonograph needle have involved mechanisms effective to measure the total length of record groove traversed by the needle or stylus of the phonograph and have consequently included means responsive to the speed of rotation of the phonograph turntable so as to allow for the playing of records at different turntable speeds. Although it might ideally be more accurate to make allowance for such different record speeds, the ever-growing acceptance of the record playing speed of 33⅓ revolutions per minute makes the provision of such compensating mechanisms somewhat unnecessary and an adequate indication of needle use can generally be obtained for the majority of phonograph users by measuring the total number of record disc sides on which a needle or stylus has been used.

It is a principal object of this invention to provide a device for counting the number of record disc sides played by a given needle or stylus.

More particularly, it is an object of this invention to provide a device for the specified purpose and which device has a relatively simple and inexpensive construction.

Another object of this invention is to provide a device for counting the number of record disc sides played on a phonograph and which device can be mounted on the phonograph without requiring either its connection to the electrical system of such a phonograph or its coupling to the mechanical controls or drive assembly of such a phonograph.

Another object of this invention is to provide a phonograph which has mounted thereon a device in accordance with this invention.

Yet another object of this invention is to provide a device for the specified purpose and which device includes an actuating member which projects into the path of a record disc moving along an upstanding axial spindle of the turntable of the phonograph so that a digital counter forming part of the device undergoes unit advance actuation during each movement of a record disc along the axial spindle of the turntable.

SUMMARY OF THE INVENTION

Broadly, the present invention provides a device for counting the number of record disc sides played on a phonograph including a turntable rotatably mounted on a generally horizontal motor board and having an upstanding axial spindle along which record discs are placed to be supported on the turntable for the playing of such discs and which device comprises a support member adapted to be secured to the motor board of the phonograph radially outwardly of the turntable thereof; a digital counter; and an actuating member operatively coupled to said digital counter and movably mounted on said support member so as to project into the path of a record disc moving downwardly along the axial spindle of the turntable when said support member is mounted on the motor board of the phonograph whereby, on movement of a record disc along the axial spindle of the turntable and past said actuating member, said digital counter is caused to undergo unit advance actuation.

The invention also embraces a phonograph which comprises a generally horizontal motor board; a turntable rotatably mounted on said motor board; an upstanding axial spindle on said turntable and along which record discs are placed to be supported on said turntable for the playing of such discs; a support member secured to said motor board radially outwardly of said turntable; a digital counter; and an actuating member operatively coupled to said digital counter and movably mounted on said support member so as to project into the path of a record disc moving along said axial spindle whereby, on movement of a record disc along said axial spindle and past said actuating member, said digital counter is caused to undergo unit advance actuation.

The digital counter used in a device in accordance with this invention can be a mechanically actuated counter or an electrically operated one. Various drive mechanisms are possible in a device in accordance with this invention to provide the desired advance actuation of the digital counter of the device on movement of a record disc along the upstanding axial spindle of the phonograph turntable.

In accordance with a particularly useful feature of this invention, the actuating member of a device in accordance with the invention is operatively coupled to the digital counter of the device so that movement of a record disc along the axial spindle of the turntable in only one direction, for example, downwardly along that spindle, causes the unit advance actuation of the digital counter.

In accordance with another particularly useful feature of this invention, the support member of a device in accordance therewith is usefully provided with a pressure sensitive adhesive coating so as to allow it easily to be mounted on the motor board of a phonograph.

Other features and advantages of the invention will become apparent as the description herein proceeds.

BRIEF DESCRIPTION OF THE DRAWINGS

The invention will now be described merely by way of illustration with reference to the accompanying drawings in which.

DESCRIPTION OF THE PREFERRED EMBODIMENTS

Figure 1:
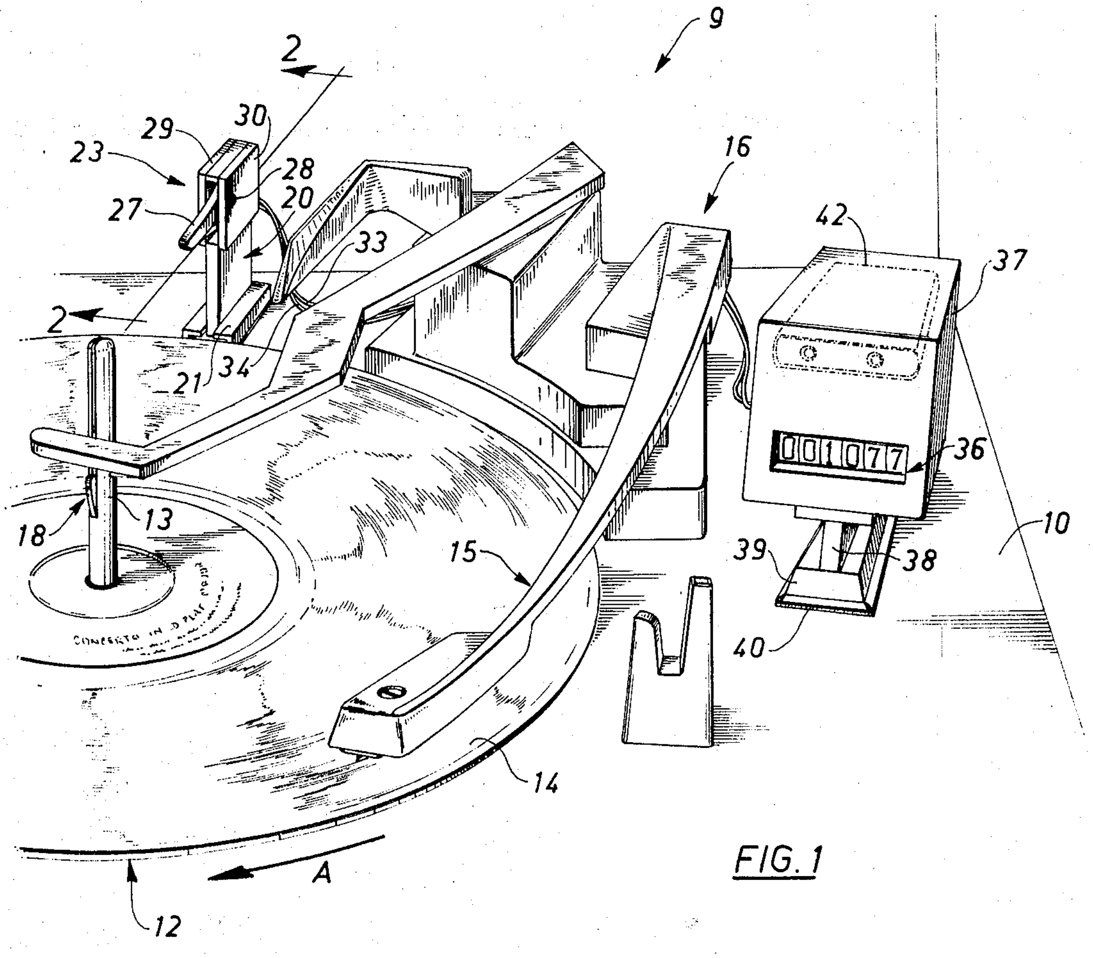
FIG. 1 is a fragmentary perspective view of a phonograph showing one embodiment of a device in accordance with this invention operatively mounted thereon.

Referring first to FIG. 1 of the accompanying drawings, there is shown therein a conventional phonograph generally indicated at 9 and including a motor board in turn generally indicated at 10 and on which a turntable 12 is mounted in a conventional manner for rotation as indicated by the arrow A (FIG. 1). An upstanding axial spindle 13 is provided on the turntable 12 for retaining record discs such as record discs 14 and 14' in position thereon. A tone arm or pick-up arm generally indicated at 15 is suitably mounted on the motor board 10 as generally indicated at 16 and a needle or stylus (not shown) is provided generally at the outer end of the pick-up arm 15 as is conventional so as to be received in the grooves in record discs such as the record disc 14 for reproduction in a conventional manner of the sounds recorded on such a disc.

The aforementioned axial spindle 13 is provided with a record release mechanism generally indicated at 18 for automatically allowing a record disc to move downwardly along the spindle 13 of the turntable 12 onto that turntable although such a mechanism is conventional and forms no part of this invention.

The embodiment of a device in accordance with this invention for counting the number of record disc sides played by a pick-up needle of the phonograph 9 includes a support member generally indicated at 20 and including a base plate 21 which is provided on its undersurface with an adhesive material 22 by means of which the support member 20 can be secured in position on the motor board 10.

Within a housing 23 provided on the upper end of the support member 20, there is mounted a micro-switch 24 having an actuating button 25 and which is normally spring-biassed into its open circuit position. An actuating member or arm 27 is pivoted at 28 between side walls 29 and 30 of the housing 23.

Figure 2:
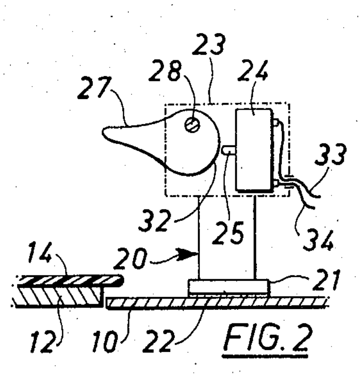
FIG. 2 is a fragmentary vertical elevation on an enlarged scale of part of the device shown in FIG. 1 when taken as indicated by the arrows 2—2 of that figure and showing an actuating member or arm of that device in its rest position.
Figure 3:
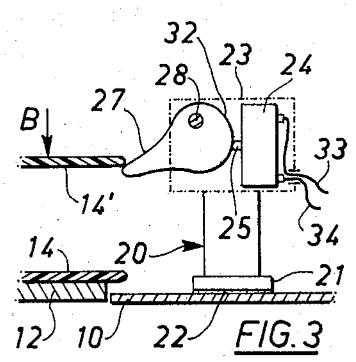
FIG. 3 is a fragmentary vertical elevation similar to that of FIG. 2 but showing the actuating arm of the device pivoted downwardly by a record disc moving downwardly along an upstanding axial spindle of the turntable of the phonograph.
Figure 4:
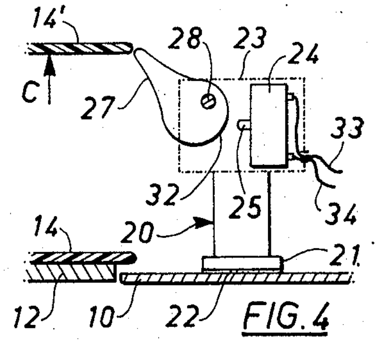
FIG. 4 is a fragmentary elevation similar to those of FIGS. 2 and 3 but showing the actuating arm of the device pivoted upwardly by a record disc being removed from the turntable upwardly along the upstanding axial spindle of the phonograph.

From FIGS. 2, 3 and 4, it will be seen that the actuating arm 27 is formed at its inner end with an abutting or cam surface generally indicated at 32 which is effective to abut and depress the actuating button 25 of the micro-switch 24 on downward pivoting movement of the outer end of the arm 27 about the pivot 28 into the position shown in FIG. 3. Depression of the button as shown in FIG. 3 is effective to connect cables 33 and 34 together. The cam surface 32 is, however, shaped so as to permit upward pivoting of the outer end of the actuating arm 27 to the position shown in FIG. 4 without causing depression of the actuating button 25.

It will be seen from FIGS. 1 to 4 that the support member 20 is mounted on the motor board 10 so that the actuating arm 27 extends slightly inwardly beyond the peripheral edge of the turntable 12 so as to be engaged by the peripheral edge of a record disc as such a disc is moved upwardly or downwardly along the upstanding axial spindle 13 of the turntable 12. During such downward movement of a record disc along the spindle 13, as indicated by the arrow B for the record disc 14' shown in FIG. 3, the outer end of the actuating arm 27 is engaged by the peripheral edge of that record disc 14' and is pivoted downwardly as actually shown in FIG. 3 so as to depress the actuating button 25 of the micro-switch 24. Similarly, on removal of the record disc 14' from the turntable 12 as indicated by the arrow C in FIG. 4, the arm 27 is pivoted upwardly as shown in that figure but, as previously explained, such upward movement of the arm 27 does not cause depression of the actuating button 25 of the micro-switch 24. It is also to be noted that the arm 27 is shaped at its outer end so that it engages the record disc such as the disc 14' generally only at the peripheral edge of that disc without significant engagement of either major face of that disc so as to avoid all risk of damage to the sound grooves or those forces of the disc.

The embodiment of a device in accordance with this invention as shown in FIGS. 1 to 5 of the accompanying drawings also comprises an electrically operated digital counter generally indicated at 36 and of conventional construction and which, for the particular embodiment illustrated, is mounted in a housing 37. The housing 37 is shown in FIG. 1 as being supported on the upper end of a pedestal 38 which is provided with a base 39 which is in turn provided with an adhesive material 40 on its undersurface so that it can be secured on the motor board 10 of the phonograph 9 in any appropriate position thereon.

Figure 5:
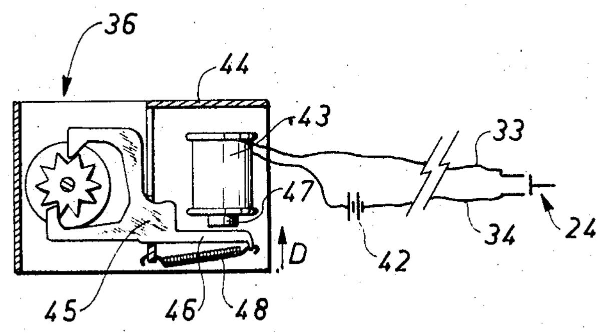
FIG. 5 is a fragmentary and somewhat schematic diagram showing the manner in which a digital counter of the device shown in FIG. 1 is actuated by movement of the actuating arm of that device.

Referring now to FIG. 5, it will be seen that a storage cell or battery 42 contained within the housing 37 is serially connected through the cables 33 and 34 with the micro-switch 24 and with a solenoid coil 43 forming part of the counter 36. The digital counter 36 includes a casing 44 and is actuated in a conventional manner by an anchor pallet 45 which is integrally formed with a pivotally mounted actuating leg 46, the end of which is aligned with a core 47 of the aforementioned solenoid coil 43. A helical tension spring 48 serves normally to move the end of the leg 46 away from the core 47. On closing of the micro-switch 24, the resulting flow of current through the solenoid coil 43 causes the leg 46 to pivot toward the core 47 of that coil as indicated by the arrow D in FIG. 5. The resulting movement of the anchor pallet 45 against the action of the spring 48 causes unit advance actuation of the counter 36.

Having described the construction of the device in accordance with this invention as shown in FIGS. 1 to 5, its manner of operation will now briefly be summarized. During such operation and each time a record disc moves downwardly along the axial spindel 13 of the turntable 12 and past the actuating arm 27, engagement of that record disc with the arm 27 causes the arm 27 to pivot downwardly to depress the actuating button 25 of the micro-switch 24 in turn to permit the flow of current through the solenoid coil 43 and so to cause unit advance actuation of the digital counter 36. Since the micro-switch is not, however, closed on the removal of a record disc upwardly along the spindle 13 of the turntable 12, such removal of a record disc from the turntable 12 does not cause actuation of the digital counter 36.

Although the device shown in FIGS. 1 to 5 as well as the alternative devices shown in the other figures of the accompanying drawings include digital counters which are actuated only on downward movement of a record disc along the axial spindle of the turntable of the phonograph, it is equally within the scope of this invention to construct a device in which the digital counter thereof is actuated only on upward removal of a record disc along and from the axial spindle of the turntable or in which such a digital counter is actuated on movement of a record disc along the axial spindle of the turntable of the phonograph in both the upward and downward directions.

Referring now to FIGS. 6 to 10 of the accompanying drawings, it is to be noted that components of the device and the phonograph shown in those figures which are identical to those shown in FIGS. 1 to 5 are identified by the same legends so as to avoid undue duplication of the description herein.

Figure 6:
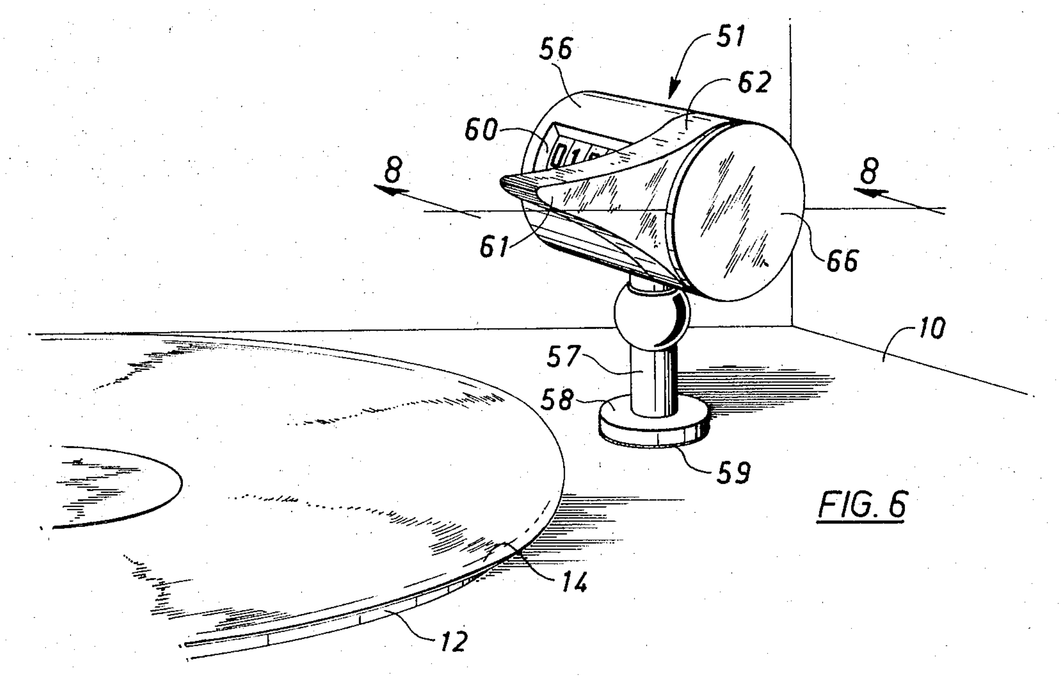
FIG. 6 is a perspective view of an alternative embodiment of a device in accordance with this invention and mounted on a phonograph which is shown fragmentarily.
Figure 7:
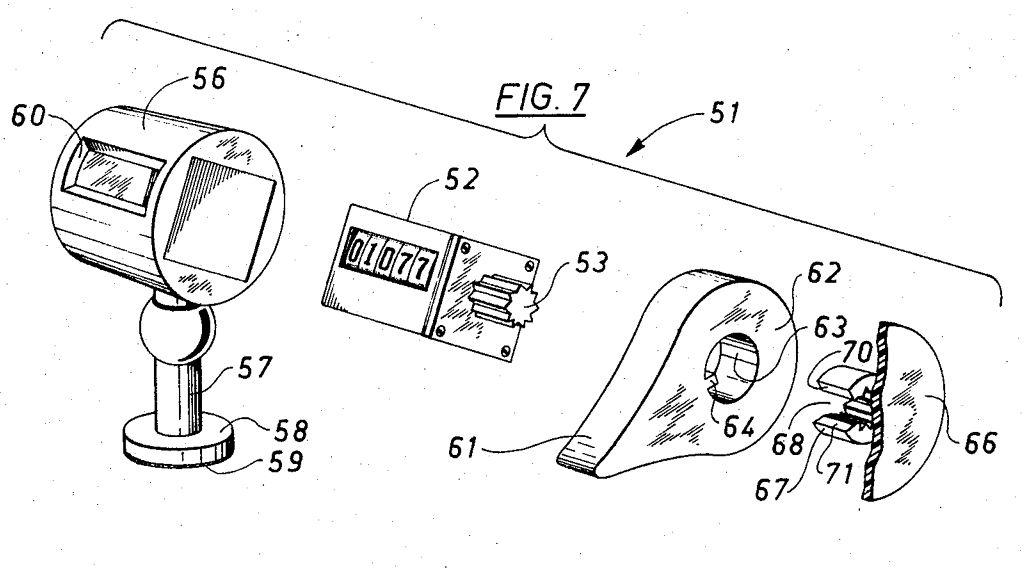
FIG. 7 is an exploded perspective view of the device shown in FIG. 6.
Figure 8:
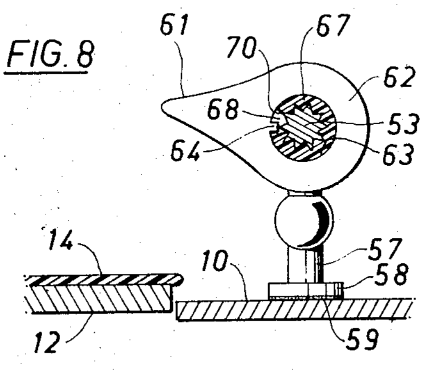
FIG. 8 is a fragmentary vertical sectional view of the device shown in FIGS. 6 and 7 when taken as indicated by the arrows 8—8 of FIG. 6 and showing an actuating member or arm of that device in a rest position thereof.
Figure 9:
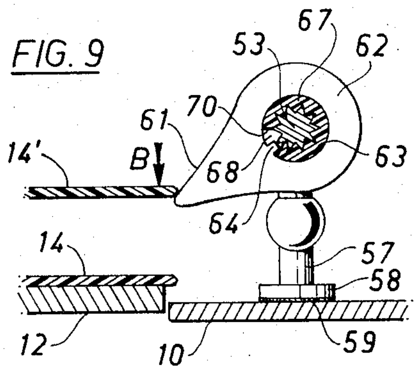
FIG. 9 is a fragmentary vertical sectional view similar to that of FIG. 8 but showing the actuating arm of the device rotated downwardly by a record disc moving downwardly along an upstanding axial spindle of the turntable of the phonograph.

The embodiment of a device in accordance with this invention and as generally indicated at 51 in FIGS. 6 and 7 of the drawings includes a mechanically operated, self-returning digital counter 52 of a conventional type and which includes a knurled drive shaft 53, limited angular rotation of which between the position shown in FIG. 8 and that shown in FIG. 9 causes unit advance actuation of the counter 52. The counter 52 is of the type in which return rotation of the shaft 53 to the position shown in FIG. 8 does not cause reverse actuation of that counter.

The counter 52 is non-rotatably received in a housing 56 which is secured on the upper end of a support member or pedestal 57 having a base 58, an adhesive coating 59 being provided on the undersurface of that base 58 to allow the device 51 to be mounted in a desired position on the motor board 10 of the phonograph. An opening 60 is provided in the housing 56 to reveal the digital wheels of the counter 52.

Figure 10:
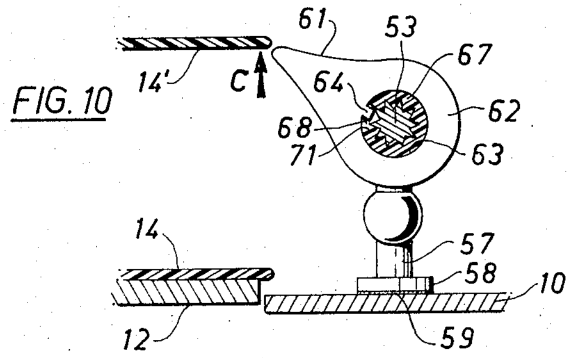
FIG. 10 is a fragmentary vertical sectional view similar to those of FIGS. 8 and 9 but showing the actuating arm of the device rotated upwardly by a record disc being removed from the turntable upwardly along the upstanding axial spindle of the phonograph.

The device 51 also includes an actuating member or arm generally indicated at 61 and which is mounted on the shaft 53 of the counter 52 in a manner yet to be described so that, when the device 51 is mounted on the phonograph, the arm 61 projects into the path of a record disc moving along the spindle 13 of the turntable 12 in the same manner as did the arm 27 of the device already described herein with reference to FIGS. 1 to 5 and as will readily be understood by reference to FIGS. 8, 9 and 10.

The inner end of the arm 61 is integrally formed with a generally discoid member 62 having a central opening 63 therethrough and a lug 64 extending radially inwardly within the opening 63. The device 51 also includes an end plate generally indicated at 66 and which is formed with an axial sleeve 67 having an internally knurled bore dimensioned to engage the outer end of the drive shaft 53 of the counter 52 for co-rotational engagement therewith. Although the cap 66 is shown in FIGS. 6 and 7 as being retained on the shaft 53 for co-rotation therewith by frictional engagement, it is equally possible to provide a key and a co-operating keyway between the shaft 53 and the sleeve 67 to ensure such co-rotation. The central opening 63 in the discoid member 62 of the actuating arm 61 is of such a diameter that the sleeve 67 can extend through that opening as will be readily understood by reference to FIGS. 8, 9 and 10. It will further be noted that the sleeve 67 is formed with an open-ended axially extending slot 68 defined by top and bottom edges 70 and 71 respectively and which receives the lug 64 when the arm 61 and the end plate 66 are in their assembled positions on the housing 56 with the counter 52 disposed therein as shown in FIG. 6.

The slot 68 in the sleeve 67 is of such a peripheral extent and is provided in such a peripheral portion of the sleeve 67 of the end plate 66 that, when the shaft 53 of the counter 52 is in its rest position, the bottom edge 71 of the slot 68 is positioned so that the arm 61 is itself disposed generally horizontally as actually shown in FIG. 8. The top edge 70 of the slot 68 is positioned so that rotation of the arm 61 about the sleeve 67 upwardly to the position shown in FIG. 10 takes place when a record disc is removed from the turntable 12 upwardly along the spindle 13 thereof as shown for the disc 14' in FIG. 10.

On the other hand, when a record disc is moved downwardly along the spindle 13 of the turntable 12 as shown in FIG. 9, engagement of that disc with the outer end of the arm 61 causes downward movement of that arm 61 and engagement of the lug 64 with the bottom edge 71 of the slot 68 causes rotation of the end plate 66 and actuating rotation of the drive shaft 53 of the counter 52.

Figure 11:
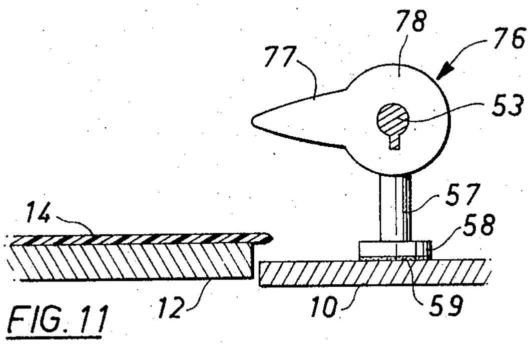
FIG. 11 is a vertical sectional view similar to that of FIG. 8 but showing an alternative construction for an actuating arm of a device in accordance with this invention, the actuating arm being shown in its rest position.
Figure 12:
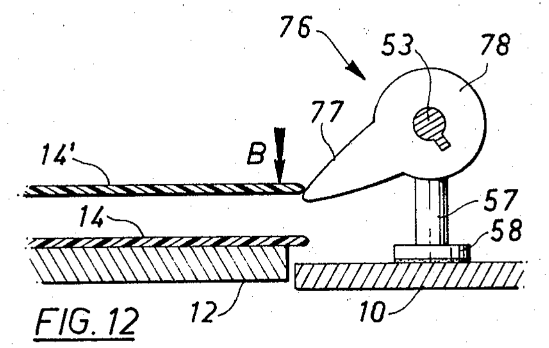
FIG. 12 is a sectional view similar to that of FIG. 11 but showing the the actuating arm rotated downwardly by a record disc moving downwardly along an upstanding axial spindle of the turntable of a phonograph.
Figure 13:
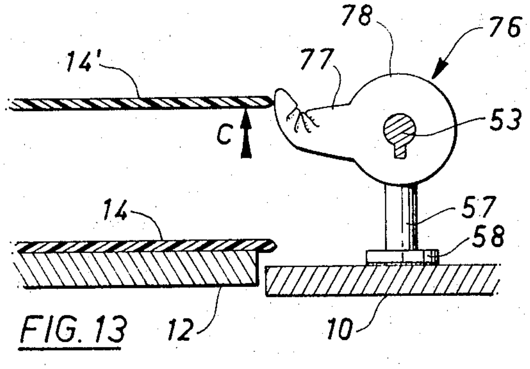
FIG. 13 is a sectional view similar to those of FIGS. 11 and 12 but showing the actuating arm resiliently upwardly deformed by a record disc being removed from the turntable upwardly along the axial spindle of the phonograph.

Referring next to FIGS. 11, 12 and 13 of the accompanying drawings, there is shown therein generally at 76 an alternative drive mechanism for use with the counter 52 of FIGS. 6 and 7. The drive mechanism 76 includes an actuating member or arm generally indicated at 77 and which is formed of a resilient material such as rubber. The arm 77 is integrally formed, for example, by moulding with a generally discoid portion 78 having an axial opening therethrough for receiving the drive shaft 53 of the counter 52 for conjoint rotation with that shaft.

During downward movement of a record disc along the spindle 13 of the turntable 12, engagement of such a disc 14' with the arm 77 as shown in FIG. 12 causes downward rotation of both the arm 77 and the shaft 53 of the counter 52 and consequently causes unit advance actuation of that counter. On the other hand, when a record disc is removed from the turntable 12 upwardly along the spindle 13 thereof as shown for the disc 14' in FIG. 13, rotation of the shaft 53 is not possible and consequently the arm 77 is resiliently and upwardly deformed as shown in FIG. 13 to allow such record disc removal without actuation of the counter 52.

Figure 14:
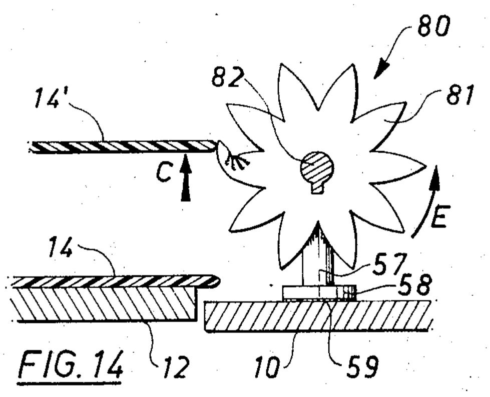
FIG. 14 is a sectional view similar to that of FIG. 13 but showing an alternative form of an actuating member provided in a device in accordance with this invention.

Referring finally to FIG. 14 of the accompanying drawings, the further alternative embodiment of a unidirectional drive mechanism as shown generally in that figure at 80 and intended for use with a digital counter of a device in accordance with this invention comprises a star-shaped and resiliently deformable actuating wheel 81 which is keyed to a shaft 82 of a mechanically operated digital counter. The counter used with the wheel 81 differs from the counter 52 in that it is of the type which undergoes unit advance actuation on forward rotation of its drive shaft 82 through a given angle in the direction indicated by the arrow E without return rotation of that shaft into a rest position. Each of the spokes or arms of the wheel 81 is resiliently deformable to permit the upward removal of a record disc along the axial spindle of the turntable of the phonograph as actually shown in FIG. 14 without counter-rotation of the shaft 82.

Although the invention has been described with reference to the particular embodiments thereof as shown in the accompanying drawings, it should be understood that constructions other than those specifically described herein are possible within the scope of this invention.

It is also within the scope of this invention to provide means whereby the digital counter provided in a device in accordance with the invention can be reset to "0" whenever a new needle is fitted in the pick-up arm of the phonograph on which the device is mounted.

Yet another modification which can be applied to a device in accordance with this invention is to construct such a device so that the vertical position of the actuating member thereof can be adjusted in turn to permit the use of the device on phonographs having their turntables disposed at varying heights above their motor boards.

What is claimed is:

1. A device for counting the number of record discs sides played on a phonograph over a period of multiple loadings thereof with record discs so as to provide an indication of the extent of use of a stylus of such a phonograph which includes a turntable rotatably mounted on a generally horizontal motor board and an upstanding axial spindle along which record discs are placed to be supported on the turntable for the playing of such discs, and which device comprises:

a support member adapted to be secured on a top surface of the motor board of the phonograph radially outwardly of the turntable thereof;

a digital counter consecutively advanceable over a period of multiple loadings of such phonograph with record discs ; and an actuating member operatively coupled to said digital counter and movably mounted on said support member and adapted to project into the path of a record disc moving along the axial spindle of the turntable when said support member is mounted on the top surface of the motor board of the phonograph whereby, on movement of a record disc along the axial spindle of the turntable and past said actuating member, said digital counter is caused to undergo unit advance actuation , so to provide an indication of the total extent of use of a stylus of such phonograph .

2. A device as claimed in claim 1 in which said actuating member is operatively coupled to said digital counter so that movement of a record disc along the axial spindle of the turntable in only one direction causes said unit advance actuation of said digital counter.

3. A device as claimed in claim 2 in which said actuating member is operatively coupled to said digital counter so that downward movement of a record disc along the axial spindle of the turntable and past said actuating member causes said unit advance actuation of said digital counter whereas upward removal of a record disc along and from the axial spindle of the turntable and past said actuating member occurs without actuation of said digital counter.

4. A device as claimed in claim 2 in which said digital counter is electrically operated and in which said device includes an electrical switch mounted on said support member and electrically connected to said digital counter so that movement of said actuating member by a record disc moving along the upstanding axial spindle of the turntable in only one direction therealong is operative to actuate said electrical switch in turn to permit the flow of electrical energy through said electrically operated digital counter so to cause unit advance actuation thereof.

5. A device as claimed in claim 4 in which said actuating member is pivotally mounted on said support member about a generally horizontal axis and includes a surface operatively abutting said switch so as to close said switch only on pivotal movement of an outer end of said actuating member by a record disc moving along the upstanding axial spindle of the turntable in one direction therealong.

6. A device as claimed in claim 5 in which said surface of said actuating member abutting said switch is in the form of a cam surface.

7. A device as claimed in claim 5 in which said support member is adapted adhesively and fixedly to be mounted on the top surface of the motor board of a phonograph.

8. A device as claimed in claim 5 in which said digital counter is battery-operated and is mounted in a housing separate from said support member.

9. A device as claimed in claim 8 in which said housing is adapted to accommodate an electrical battery therein.

10. A device as claimed in claim 8 in which said housing is adapted adhesively to be mounted on the top surface of the motor board of a phonograph.

11. A device as claimed in claim 1 in which said digital counter is mounted on said support member and includes a drive shaft and in which said actuating member is coupled to said drive shaft of said digital counter so as to cause unit advance actuating rotation of that shaft on movement of a record disc along the upstanding axial spindle of the turntable.

12. A device as claimed in claim 11 in which said drive shaft of said digital counter is unidirectionally rotatable for causing unit advance actuation of said digital counter and in which said actuating member is in part resiliently deformable whereby, on movement of a record disc along the upstanding axial spindle of the turntable in one direction therealong, resulting movement of said actuating member is operative to cause unit advance actuating rotation of said drive shaft of said digital counter whereas, on movement of a record disc along the upstanding axial spindle of the phonograph in an opposite direction therealong, engagement of such a record disc with said actuating member causes resilient deformation of said actuating member without actuating rotation of said drive shaft of said digital counter.

13. A device as claimed in claim 11 in which said drive shaft of said digital counter is unidirectionally rotatable for causing unit advance actuation of said digital counter and in which said actuating member is coupled to said drive shaft of said digital counter through a unidirectional drive means whereby movement of a record disc along the upstanding axial spindle of the turntable in only one direction therealong causes said unit advance actuation of said digital counter.

14. A device as claimed in claim 13 in which said actuating member is rotatably mounted on said drive shaft of said digital counter and in which said actuating member and said drive shaft include co-operating abutments whereby rotational movement of said actuating member by a record disc moving along the upstanding axial spindle of the turntable in one direction therealong causes unit advance actuating rotation of said drive shaft whereas rotational movement of said actuating member about said drive shaft by a record disc moving along the upstanding axial spindle of the turntable in the opposite direction occurs without advance actuation of said digital counter.

15. A device as claimed in claim 14 in which said actuating member has such a configuration that it engages a record disc moving upwardly or downwardly along the upstanding axial spindle of the turntable generally only at the peripheral edge of such a record disc.

16. A device as claimed in claim 14 in which said support member is adapted adhesively to be bonded to the motor board of a phonograph.

17. A phonograph which comprises:

a generally horizontal motor board having a top surface ;

a turntable rotatably mounted on said motor board;

an upstanding axial spindle on said turntable and along which record discs are placed to be supported on said turntable for the playing of such discs;

a support member secured on said top surface of said motor board radially outwardly of said turntable;

a digital counter consecutively advanceable over a period of multiple loadings of said phonograph with records discs ; and an actuating member operatively coupled to said digital counter and movably mounted on said support member so as to project into the path of a record disc moving along said axial spindle whereby, on movement of a record disc along said axial spindle and past said actuating member, said digital counter is caused to undergo unit advance actuation so to provide an indication of the extent of use of a stylus of said phonograph over a period of multiple loadings thereof .

18. A phonograph as claimed in claim 17 in which said actuating member is operatively coupled to said digital counter so that movement of a record disc along said axial spindle in only one direction causes said unit advance actuation of said digital counter.

19. A phonograph as claimed in claim 18 in which said actuating member is operatively coupled to said digital counter so that downward movement of a record disc along said axial spindle and past said actuating member causes said unit advance actuation of said digital counter whereas upward removal of a record disc along and from said axial spindle and past said actuating member occurs without actuation of said digital counter.

20. A phonograph as claimed in claim 18 in which said digital counter is electrically operated and which includes an electrical switch mounted on said support member and electrically connected to said digital counter so that movement of said actuating member by a record disc moving along said upstanding axial spindle in only one direction therealong is operative to actuate said electrical switch in turn to permit the flow of electrical current through said electrically operated digital counter so to cause unit advance actuation thereof.

21. A phonograph as claimed in claim 20 in which said actuating member is pivotally mounted on said support member about a generally horizontal axis and includes a surface operatively abutting said switch so as to close said switch only on pivotal movement of an outer end of said actuating member by a record disc moving along said upstanding axial spindle in one direction therealong.

22. A phonograph as claimed in claim 21 in which said surface of said actuating member abutting said switch is in the form of a cam surface.

23. A phonograph as claimed in claim 21 in which said support member is adhesively mounted on the top surface of said motor board.

24. A phonograph as claimed in claim 21 in which said digital counter is battery-operated and is mounted in a housing separate from said support member.

25. A phonograph as claimed in claim 24 in which said housing is adapted to accommodate an electrical battery therein.

26. A phonograph as claimed in claim 24 in which said housing is adhesively mounted on the top surface of said motor board.

27. A phonograph as claimed in claim 17 in which said digital counter is mounted on said support member and includes a drive shaft and in which said actuating member is coupled to said drive shaft of said digital counter so as to cause unit advance actuating rotation of that shaft on movement of a record disc along said upstanding axial spindle.

28. A phonograph as claimed in claim 27 in which said drive shaft of said digital counter is unidirectionally rotatable for causing unit advance actuation of said digital counter and in which said actuating member is in part resiliently deformable whereby, on movement of a record disc along said upstanding axial spindle in one direction therealong, resulting movement of said actuating member is operative to cause unit advance actuating rotation of said drive shaft of said digital counter whereas, on movement of a record disc along said upstanding axial spindle in an opposite direction therealong, engagement of such a record disc with said actuating member causes resilient deformation of said actuating member without actuating rotation of said drive shaft of said digital counter.

29. A phonograph as claimed in claim 27 in which said drive shaft of said digital counter is unidirectionally rotatable for causing unit advance actuation of said digital counter and in which said actuating member is coupled to said drive shaft of said digital counter through a unidirectional drive means whereby movement of a record disc along said upstanding axial spindle in only one direction therealong causes said unit advance actuation of said digital counter.

30. A phonograph as claimed in claim 29 in which said actuating member is rotatably mounted on said drive shaft of said digital counter and in which said actuating member and said drive shaft include cooperating abutments whereby rotational movement of said actuating member by a record disc moving along said upstanding axial spindle in one direction therealong causes unit advance actuating rotation of said drive shaft whereas rotational movement of said actuating member about said drive shaft by a record disc moving along said upstanding axial spindle in the opposite direction occurs without advance actuation of said digital counter.

31. A device as claimed in claim 30 in which said actuating member has such a configuration that it engages a record disc moving upwardly or downwardly along said upstanding axial spindle generally only at the peripheral edge of such a record disc.

32. A phonograph as claimed in claim 30 in which said support member is adhesively mounted on said motor board.

* * * * *